(12) United States Patent
Niu et al.

(10) Patent No.: US 10,373,720 B2
(45) Date of Patent: Aug. 6, 2019

(54) MIGRATION PREVENTION SYSTEM FOR RADIOACTIVE WASTEWATER OF UNDERGROUND NUCLEAR POWER PLANT

(71) Applicant: CHANGJIANG SURVEY PLANNING DESIGN AND RESEARCH CO., LTD., Wuhan (CN)

(72) Inventors: Xinqiang Niu, Wuhan (CN); Qigui Yang, Wuhan (CN); Hongbin Li, Wuhan (CN); Shuda Zhou, Wuhan (CN); Xin Zhao, Wuhan (CN); Huatang Shi, Wuhan (CN); Qianlong Han, Wuhan (CN); Nianfeng Xu, Wuhan (CN); Haibo Liu, Wuhan (CN); Jie He, Wuhan (CN); Weina Yu, Wuhan (CN); Lijun Su, Wuhan (CN); Yanguo Fang, Wuhan (CN)

(73) Assignee: CHANGJIANG SURVEY PLANNING DESIGN AND RESEARCH CO., LTD., Wuhan (CN)

( * ) Notice: Subject to any disclaimer, the term of this patent is extended or adjusted under 35 U.S.C. 154(b) by 65 days.

(21) Appl. No.: 15/376,635

(22) Filed: Dec. 12, 2016

(65) Prior Publication Data
US 2017/0092384 A1 Mar. 30, 2017

Related U.S. Application Data

(63) Continuation-in-part of application No. PCT/CN2015/079888, filed on May 27, 2015.

(30) Foreign Application Priority Data

Jun. 13, 2014 (CN) .......................... 2014 1 0264273
Jun. 13, 2014 (CN) ..................... 2014 2 0318038 U

(51) Int. Cl.
*G21C 13/08* (2006.01)
*G21C 11/00* (2006.01)
(Continued)

(52) U.S. Cl.
CPC .............. *G21C 13/08* (2013.01); *G21C 11/00* (2013.01); *G21C 13/093* (2013.01); *G21F 1/04* (2013.01);
(Continued)

(58) Field of Classification Search
CPC . G21F 1/04; G21F 1/042; G21F 1/047; G21F 9/34; G21F 9/36; G21F 7/00;
(Continued)

(56) References Cited

U.S. PATENT DOCUMENTS 4,167,087 A * 9/1979 Schabert ................ G21C 13/00
109/15
4,192,629 A * 3/1980 Hallenius ................ E21D 13/00
405/129.35
(Continued)

*Primary Examiner* — Sharon M Davis
(74) *Attorney, Agent, or Firm* — Matthias Scholl P.C.; Matthias Scholl

(57) ABSTRACT

A migration prevention system for radioactive wastewater from an underground nuclear power plant. The underground nuclear power plant includes a nuclear island including an underground cavern group including a reactor cavity and auxiliary cavities. The migration prevention system includes a protective layer coating the reactor cavity and an impermeable layer surrounding the nuclear island. The protective layer includes an inner liner, a drainage layer, and a filling layer of rock fractures in that order. The inner liner is configured to prevent exosmosis of the radioactive wastewater of the reactor cavity. The drainage layer is configured to gather and drain seepage water. The impermeable layer is disposed in the periphery of the underground cavern group including the reactor cavity and the auxiliary cavities, and is
(Continued)

configured to isolate the underground cavern group from natural underground water.

6 Claims, 3 Drawing Sheets

(51) Int. Cl.
    *G21F 1/04*     (2006.01)
    *G21C 13/093*     (2006.01)
    *G21F 7/00*     (2006.01)
    *G21F 9/22*     (2006.01)
    *E02D 31/00*     (2006.01)
    *E02D 29/045*     (2006.01)

(52) U.S. Cl.
    CPC ............... *G21F 7/00* (2013.01); *G21F 9/22* (2013.01); *E02D 29/045* (2013.01); *E02D 31/00* (2013.01)

(58) Field of Classification Search
    CPC ..... G21C 11/00; G21C 11/081; G21C 11/086; G21C 13/08; G21C 13/093; G21D 2010/00
    See application file for complete search history.

(56) References Cited

U.S. PATENT DOCUMENTS 4,244,153 A * 1/1981 Schwarzer ............. G21C 13/00
    376/273
5,026,215 A * 6/1991 Clarke .................... C04B 28/08
    106/714

* cited by examiner

MIGRATION PREVENTION SYSTEM FOR RADIOACTIVE WASTEWATER OF UNDERGROUND NUCLEAR POWER PLANT

CROSS-REFERENCE TO RELATED APPLICATIONS

This application is a continuation-in-part of International Patent Application No. PCT/CN2015/079888 with an international filing date of May 27, 2015, designating the United States, now pending, and further claims foreign priority benefits to Chinese Patent Application No. 201410264273.7 filed Jun. 13, 2014, and to Chinese Patent Application No. 201420318038.9 filed Jun. 13, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a migration prevention system for radioactive wastewater from an underground nuclear power plant.

Description of the Related Art

The migration of radioactive wastewater from underground nuclear power plants poses serious threats to natural environments.

Typically, the nuclear waste is sealed and buried, but radioactive wastewater tends to permeate and pollute the surrounding environment.

SUMMARY OF THE INVENTION

In view of the above-described problems, it is one objective of the invention to provide a migration prevention system for radioactive wastewater from an underground nuclear power plant that has multiple layers of waterproof structures. When using the migration prevention system for radioactive wastewater, the environmental pollution of the underground nuclear power plants can be greatly decreased.

To achieve the above objective, in accordance with one embodiment of the invention, there is provided a migration prevention system for radioactive wastewater from an underground nuclear power plant, the underground nuclear power plant comprising a nuclear island comprising an underground cavern group comprising a reactor cavity and auxiliary cavities, and the migration prevention system comprising a protective layer coating the reactor cavity, the protective layer comprising an inner liner, a drainage layer, and a filling layer of rock fractures in that order; and an impermeable layer surrounding the nuclear island. The inner liner is configured to prevent exosmosis of the radioactive wastewater of the reactor cavity; the drainage layer is configured to gather and drain seepage water; the drainage layer is disposed between the inner liner and the filling layer of rock fractures; and the impermeable layer is disposed in a periphery of the underground cavern group comprising the reactor cavity and the auxiliary cavities, and is configured to isolate the underground cavern group from natural underground water.

In a preferred embodiment of the invention, the reactor cavity is surrounded by the inner liner, the inner filling layer of rock fractures, the drainage layer, and the outer filling layer of rock fractures from inside to outside in that order.

In a class of this embodiment, the inner liner is a reinforced concrete structure, or the inner liner is a reinforced concrete structure plus waterproof board. The inner liner is configured to seal the reactor cavity, and prevent the exosmosis of the cooling water of the reactor cavity when serious accidents occur.

In a preferred embodiment of the invention, the inner filling layer of rock fractures and the outer filling layer of rock fractures both comprise grouting materials in the rock fractures and the rock mass. The inner filling layer of rock fractures is disposed at a cavity wall and the surrounding rock of the reactor cavity, thus further improving the impermeability performance of the cavity wall and the surrounding rock. The outer filling layer of rock fractures is configured to isolate underground water of rock mass in the cavern group from the underground water of the surrounding rock of the reactor cavity.

In a preferred embodiment of the invention, the drainage layer comprises multiple layers of first drainage tunnels and first drainage holes communicating with the first drainage tunnels. The first drainage holes are drilled into the first drainage tunnels, and are mutually connected. The drainage layer is configured to gather and drain the seepage water which is from the inner liner and the inner filling layer of rock fractures when serious accidents occur. The distance between the first drainage holes is less than 2 m to ensure the drainage performance In a preferred embodiment of the invention, the impermeable layer comprises multiple layers of second drainage tunnels and second drainage holes communicating with the second drainage tunnels. The second drainage holes are drilled into the second drainage tunnels, and are mutually connected. The impermeable layer is configured to prevent natural groundwater seepage to the underground cavern group, decrease the groundwater seepage pressure, and ensure the stability of the surrounding rock of the reactor cavity. The hydraulic connection between water inside and outside of the nuclear island is blocked by the impermeable layer, and the underground cavern group is at the rock mass unwatering area.

The migration prevention system for radioactive wastewater of the invention combines the nuclear power technology and the seepage control technology of underground rock mass, and creatively applies the seepage control measures of the hydropower project to the migration prevention system for radioactive wastewater, so that multiple safeguard measures are employed to prevent underground migration of the radioactive waste water.

Advantages of the migration prevention system for radioactive wastewater according to embodiments of the invention are summarized as follows:

In terms of the characteristics of the migration of the radioactive waste water when serious accidents occur in the underground nuclear power plant, and in combination with the natural safeguard of the rock mass, the reactor cavity is creatively coated with the inner liner, the drainage layer, and the filling layer of rock fractures, and thus the underground migration channel of the radioactive waste water is blocked. In addition, a collection, disposal, and monitor system is provided, and the radioactive waste water generated at serious accidents or during normal operation is cut off, collected, and processed in the migration prevention system for radioactive wastewater. The large-scale migration of radioactive material is prevented.

BRIEF DESCRIPTION OF THE DRAWINGS

The invention is described hereinbelow with reference to the accompanying drawings, in which.

Figure 1:
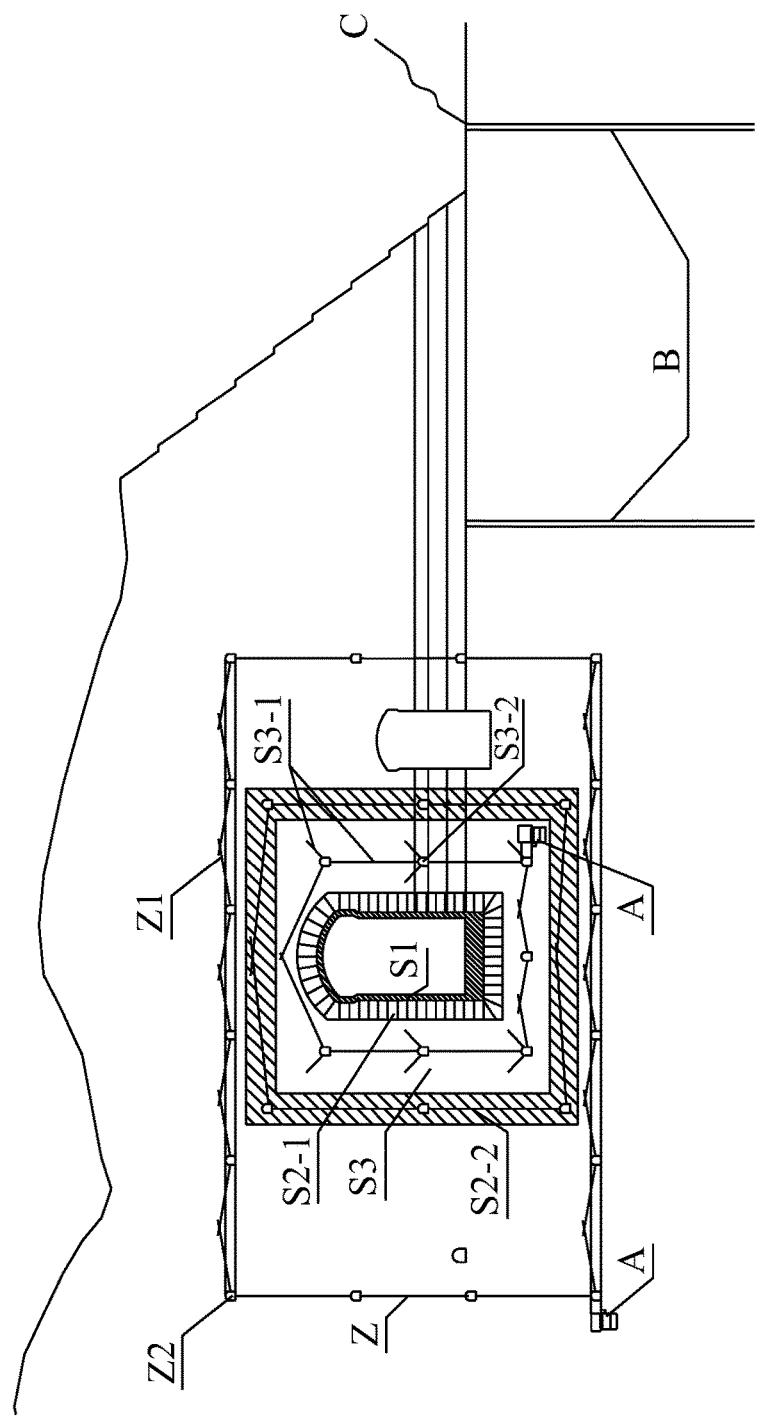
FIG. 1 is a schematic diagram of a migration prevention system for radioactive wastewater from an underground nuclear power plant.

In the drawings, the following reference numbers are used: S. Protective layer of a reactor cavity; $S_1$. Inner liner; $S_{2-1}$. Inner filling layer of rock fractures; $S_{2-2}$. Outer filling layer of rock fractures; $S_3$. Drainage layer; $S_{3-1}$. First drainage holes; $S_{3-2}$. First drainage tunnels; Z. Impermeable layer; $Z_1$. Second drainage holes; $Z_2$. Second drainage tunnels; A. Seepage water collection; B. Monitoring points; and C. Visualization system for detection, transmission, and report.

DETAILED DESCRIPTION OF THE EMBODIMENTS

For further illustrating the invention, experiments detailing a migration prevention system for radioactive wastewater from an underground nuclear power plant are described below. It should be noted that the following examples are intended to describe and not to limit the invention.

As shown in FIG. 1, the migration prevention system for radioactive wastewater from an underground nuclear power plant comprises a protective layer S of reactor cavity and an impermeable layer Z. The impermeable layer is configured to isolate the underground cavern group from natural underground water. The protective layer and the impermeable layer are sealed structures. The protective layer S comprises an inner liner $S_1$, a drainage layer $S_3$, and a filling layer of rock fractures. The inner liner is configured to prevent exosmosis of the radioactive wastewater. The drainage layer is configured to drain seepage water. The filling layer of rock fractures comprises an inner filling layer of rock fractures $S_{2-1}$ and an outer filling layer of rock fractures $S_{2-2}$. The reactor cavity is surrounded by the inner liner, the drainage layer, and the filling layer of rock fractures. The impermeable layer Z is disposed in the periphery of an underground cavern group which comprises the reactor cavity and auxiliary cavities.

The reactor cavity completely retains all the nuclear safety safeguard procedures of aboveground nuclear power plant, which means, the monitor, collection, storage, and disposal facilities remain in the containment or outside the containment, and the monitor equipment and the specialized drainage equipment also remain at the drain point. The radioactive waste water is mainly from the seepage of the reactor cavity when serious accidents happen, thus on the basis of the nuclear safely safeguard procedures of above ground nuclear power plant, the reactor cavity is specially safeguarded by the following four safeguard structures:

1. The inner liner $S_1$, a high-performance protective structure at the cavity wall The inner liner $S_1$ is disposed at the inner wall of the reactor cavity. The inner liner $S_1$ is a reinforced concrete liner layer featuring high impermeability. The thickness of the liner concrete on the arch crown and the surrounding thereof is between 0.5 m and 1 m, and the liner concrete of the bottom plate can be thicker according to needs. The impermeability grade of the liner concrete is W12, and the permeability coefficient of the liner concrete is $1.3 \times 10^{-9}$ cm/s. Meanwhile, the fracture on the surrounding rock of the reactor cavity is filled and sealed using impervious material. In case of the cracking of the liner concrete of the reactor cavity caused by earthquake, which results in growing seepage of cooling water, the bottom plate and the surrounding thereof of the reactor cavity can use steel liner. When serious accidents occur due to earthquake, the steel liner cavity can be filled with cooling water to prevent core melt accident while the cooling water seepage to the external rock mass is avoided, thus the nuclear safety protection is ensured.

Because the impermeability grade of the liner concrete is W12 (the highest level according to Quality & Standardization of China Concrete GB50164-2011), the liner concrete can resist 120 m of water head pressure without water seepage. The Shuibuya Facing Rockfill Dam, the highest built concrete facing rockfill dam in the world with a maximum dam height of 233 m, uses a concrete facing for dam body seepage control. The impermeability grade of the concrete facing is W12, and a maximum thickness of the concrete facing is only 1.1 m. The dam has been put into operation for years, yet no error occurs. When the containment of the underground nuclear power plant ruptures, and the cooling water is filled in the cavity to prevent core melt accident, the depth of the cooling water is about 20 m, which is far lower than the water head of the Shuibuya Facing Rockfill Dam, thus the liner concrete whose impermeability grade is W12 can effectively prevent cooling water exosmosis from the reactor cavity.

2. The inner filling layer of rock fractures $S_{2-1}$, a high-intensity grouting and fracture sealing structure The inner filling layer of rock fractures $S_{2-1}$ is disposed at an outer side of the inner liner $S_1$. The inner filling layer of rock fractures $S_{2-1}$ is used for high-intensity grouting on the cavity wall and the surrounding rock of the reactor cavity, and for fracture sealing, thus the rock mass and the grouting material form a sealed layer, and the integrity and the impermeability of the cavity wall and the surrounding rock are further improved. The impermeability of the rock mass within the sealed layer reaches $10^{-6}$ cm/s. Row spacing of the grout holes is between 1 m×1 m and 2 m×2 m, and a work depth is between 8 m and 12 m.

3. The drainage layer $S_3$, an efficient drainage structure

To further prevent seepage of radioactive water, the periphery of the inner filling layer of rock fractures $S_{2-1}$ is provided with the passive drainage layer $S_3$ which can automatically drain water. The drainage layer $S_3$ comprises multiple layers of first drainage tunnels and first drainage holes communicating with the first drainage tunnels. The first drainage holes are drilled into the first drainage tunnels, and are mutually connected. The distance between the first drainage holes is between 1 m and 2 m.

4. The outer filling layer of rock fractures $S_{2-2}$, an impermeable curtain structure The periphery of the drainage layer $S_3$ is provided with the outer filling layer of rock fractures $S_{2-2}$, so that the hydraulic connection is completely blocked. The outer filling layer of rock fractures comprises multiple layers of grouting adits and curtain holes. The curtain holes are drilled into the grouting adits, and are mutually connected. The rock fracture is filled, grouted, and sealed. The rock mass and the grouting material form a sealed layer. The standard of the curtain is a maximum of 0.5 Lu in the current grouting technology. The permeability coefficient thereof equals to $5\times10^{-6}$ cm/s. The impermeable curtain structure is arranged in a single row, and the distance between curtain holes is 2 m. The impermeable curtain structure can be arranged in multiple rows, and the distance between curtain holes can be shortened according to grouting experiments and impermeability examination.

In the migration prevention system for radioactive wastewater, a combination of the inner liner $S_1$ and the inner filling layer of rock fractures $S_{2-1}$ enables the impermeability of the reactor cavity to reach $10^{-9}$ cm/s, and basically, the cooling water seepage of the reactor cavity when serious accidents occur is prevented. The drainage layer $S_3$ is configured to gather and drain the radioactive waste water which is possible to leak out from the inner liner and the inner filling layer of rock fractures. The outer filling layer of rock fractures $S_{2-2}$ is configured to block the exchange between underground water of the rock mass in the underground cavern group and the surrounding rock of the reactor cavity. Therefore, when serious accidents occur, the seepage of external underground water to the underground cavern group is prevented, meanwhile the radioactive waste water is controlled within the set area, thus further improving the safety protection of the nuclear power plant when serious accidents occur.

In addition, the impermeable layer Z is configured to prevent natural groundwater seepage to the underground cavern group, decrease the groundwater seepage pressure, and ensure the stability of the surrounding rock of the reactor cavity. The hydraulic connection between water inside and outside of the underground cavern group is blocked by the impermeable layer, and the underground waste water is at the rock mass unwatering area. The impermeable layer Z is 25 m away from the underground cavern group. The impermeable layer comprises multiple layers of second drainage tunnels $Z_2$ and second drainage holes $Z_1$. The second drainage holes are drilled into the second drainage tunnels, and are mutually connected. The distance between the second drainage holes $Z_1$ is between 1 m and 2 m. The impermeable layer Z is fully closed.

The bottom layer subareas of the impermeable layer Z and the drainage layer $S_3$ each are provided with the specialized ditch, pipe, well, channel, pool, tank, and relevant facilities which are meant for seepage water collection A. The dilution, concentration, attachment, curing, etc. of the seepage water are pre-planned, and the seepage water is disposed according to the measured concentration. The storage device and the disposal device calculate the seepage quantity according to the water head of the reactor cavity, the permeability of the rock mass, and the function of the migration prevention system for radioactive wastewater, so that sufficient safety margin is ensured.

To monitor the underground migration of radioactive waste water generated in the underground nuclear power plant, a plurality of monitoring points B is disposed at several areas of the migration prevention system for radioactive wastewater. The monitoring points are holes or channels. In addition, a visualization system C for detection, transmission, and report is disposed at the monitoring points. The visualization system is configured to real-timely monitor the status and the radioactivity of the underground water, and takes measures according to the results.

The above arrangements provide the underground nuclear power plant with multiple safety shields: the inner liner $S_1$, the inner filling layer of rock fractures $S_{2-1}$, the drainage layer $S_3$, the outer filling layer of rock fractures $S_{2-2}$ from the center of the reactor cavity to the external rock mass. In combination with the natural safeguard of the rock mass, the radioactive waste water generated at serious accidents, such as core melt accident caused by containment damage at which the reactor cavity is filled with cooling water, is sealed in the safeguard area where the radioactive waste water is processed in accordance with the safety standard and discharged. Therefore, the underground migration and seepage of the radioactive waste water are effectively prevented.

An equivalent quasi-three-dimensional model using continuous porous fractured medium at a simulative underground nuclear power plant sitting is built to analyze the safeguard performance Under earthquake condition, the effect of the inner liner $S_1$ is not taken into account (as the safety margin). The working conditions comprise: 1. normal operation; 2. basis accident; 3. serious accident not caused by earthquake (containment damage, and the cavity is filled with 20 m deep of cooling water to prevent core melt accident); 4. serious accident caused by earthquake.

Figure 2:
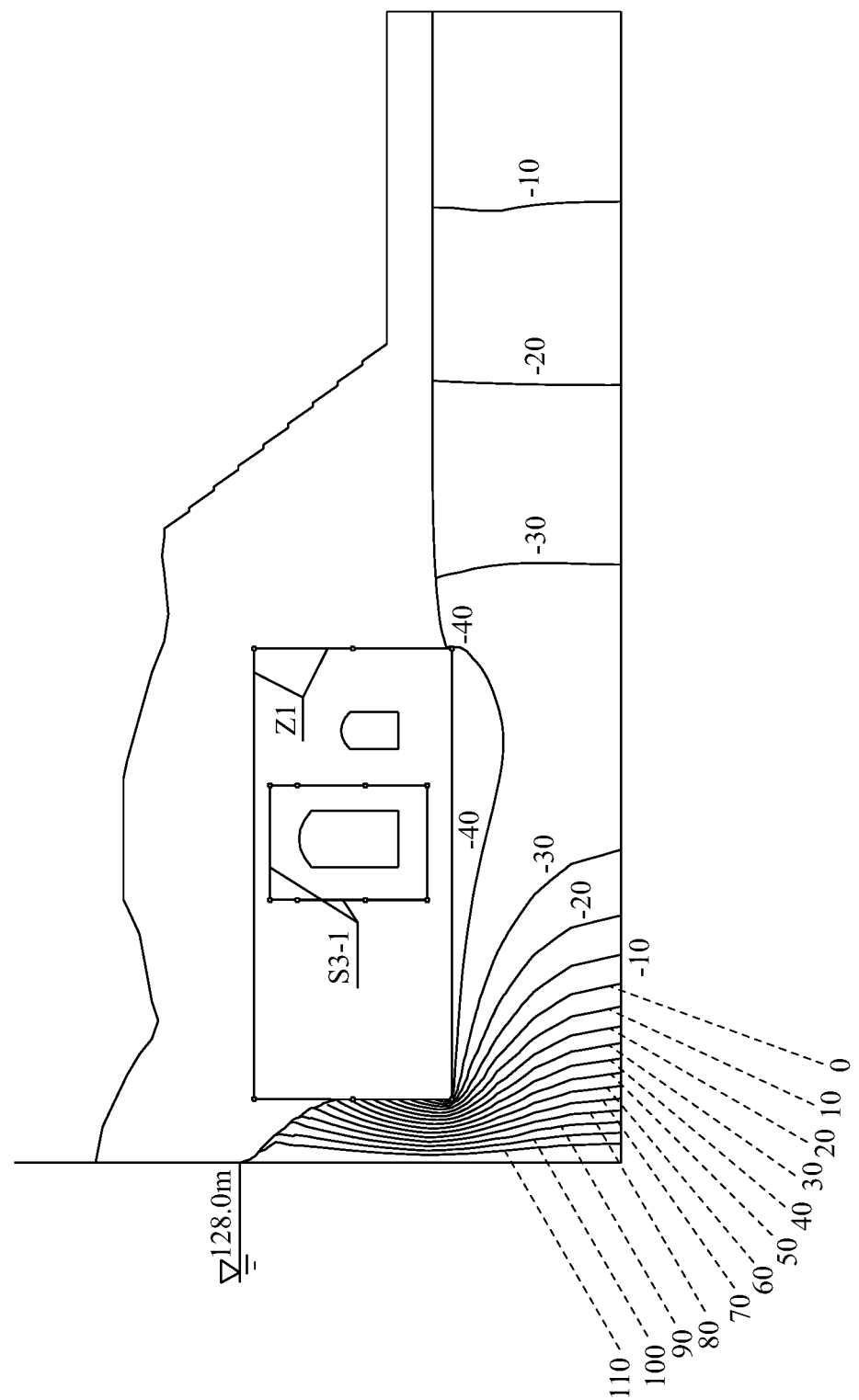
FIG. 2 is a contour map of water heads in a seepage field under different simulated conditions using the migration prevention system for radioactive wastewater in FIG. 1 (unit: m)
Figure 3:
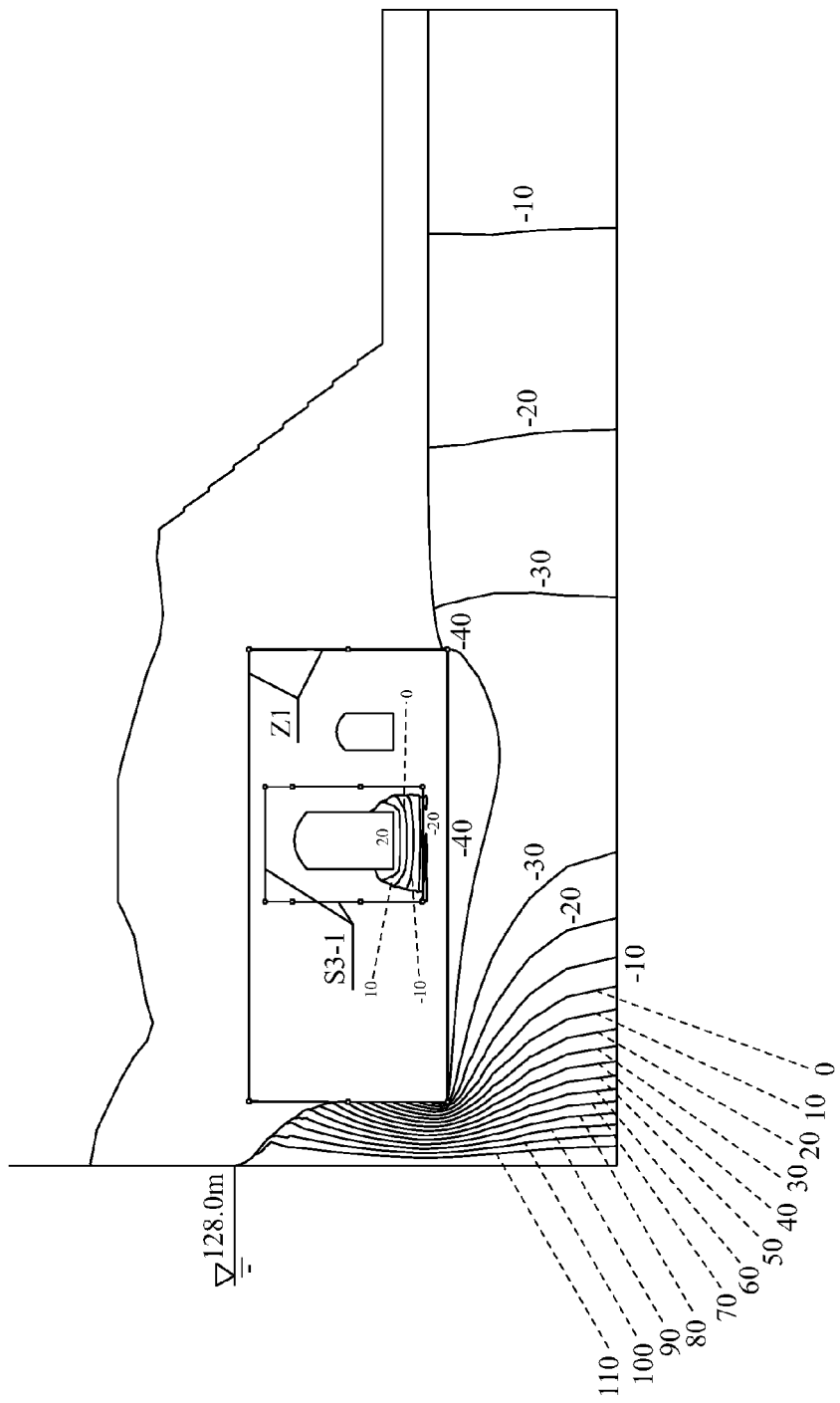
FIG. 3 is a contour map of water heads in a seepage field under earthquake condition using the migration prevention system for radioactive wastewater in FIG. 1 (unit: m).

As analyzed from the results: 1. At the normal operation, the design basis accident, and the serious accident not caused by earthquake, the hydraulic connection between the radioactive waste water generated by the underground nuclear power plant and water of the surrounding rock is completely cut off, thus the seepage of radioactive waste water is none. The migration prevention system for radioactive wastewater works to from an unwatering area in the underground cavern group, and ensure a stable and good working environment of the surrounding rock of the reactor cavity (as shown in FIG. 2). 2. At the serious accident caused by earthquake, the containment is damaged, and the reactor cavity is filled with 20 m deep of cooling water to prevent core melt accident. In the unwatering area of the underground cavern group, a small seepage field is formed in the vicinity of the reactor cavity, yet the small seepage field has no hydraulic connection with surrounding seepage field (as shown in FIG. 3). The radioactive waste water released from the reactor cavity to the surrounding rock is only 0.60 m³/h. The radioactive waste water is cut off by the impermeable curtain, drained by the drainage curtain, and is gathered and processed, thus the small amount of radioactive wastewater is controlled and processed within the protective area, preventing large-scale migration of radioactive waste water, and following the multiple-layer safeguard concept.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A migration prevention system for radioactive wastewater from an underground nuclear power plant, the underground nuclear power plant comprising a nuclear island comprising a reactor cavity, and the migration prevention system comprising:
   a protective structure surrounding the reactor cavity, the protective structure comprising an inner liner defining a wall of the reactor cavity, a drainage layer surrounding the inner liner, and an outer filling layer of rock fractures surrounding the drainage layer; and an impermeable layer surrounding the outer filling layer of rock fractures and defining a periphery of the nuclear island;

wherein:

the inner liner is configured to prevent exosmosis of radioactive wastewater of the reactor cavity;

the drainage layer is configured to gather and drain seepage water;

the drainage layer is disposed between the inner liner and the outer filling layer of rock fractures; and the impermeable layer is configured to isolate the nuclear island from natural underground water.

2. The system of claim 1, wherein the protective structure further comprises an inner filling layer of rock fractures.

3. The system of claim 2, wherein the inner filling layer of rock fractures is disposed between the inner liner and the drainage layer.

4. The system of claim 3, wherein the inner liner is a reinforced concrete structure.

5. The system of claim 4, wherein the reinforced concrete structure is impermeable to the radioactive wastewater of the reactor cavity.

6. The system of claim 3, wherein the inner filling layer of rock fractures and the outer filling layer of rock fractures both comprise rock mass and grouting materials in the rock fractures.

* * * * *